3,652,569
ERGONINE, ERGOPTINE AND THE 1-METHYL
AND 9,10-DIHYDRO DERIVATIVES THEREOF
Paul Stadler, Biel-Benken, Hartmut Hauth, Riehen, Gernot Wersin, Bottmingen, Stephan Guttmann, Allschwil, Albert Hofmann, Bottmingen, Peter Stutz, Basel, and Hans Willems, Allschwil, Switzerland, assignors to Sandoz Ltd., also known as Sandoz AG, Basel, Switzerland
No Drawing. Continuation-in-part of application Ser. No. 747,819, July 26, 1968. This application Jan. 21, 1971, Ser. No. 108,641
Claims priority, application Switzerland, Aug. 2, 1967, 10,900/67
Int. Cl. C07d 51/72
U.S. Cl. 260—268 PE          14 Claims

ABSTRACT OF THE DISCLOSURE

The invention concerns new ergot peptide alkaloids of the formula

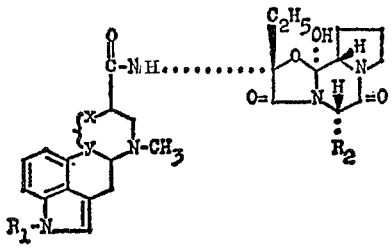

wherein

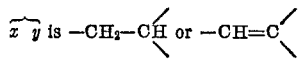 is $-CH_2-CH\big\langle$ or $-CH=C\big\langle$ $R_1$ is hydrogen or methyl, and
$R_2$ is isopropyl or isobutyl, and pharmaceutically acceptable and addition salts thereof.

The compounds are useful in the treatment of migraine. Compounds in which

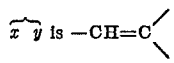 is $-CH=C\big\langle$ $R_1$ is hydrogen and $R_2$ has the above significance are also vasoconstrictors. Furthermore, compounds in which $R_1$ is hydrogen are also diuretics.

---

This is a continuation-in-part of copending application S.N. 747,819, filed July 26, 1968 and now abandoned.

The present invention relates to new ergot peptide alkaloids and processes for their production.

More particularly, the invention provides crystalline ergot peptide alkaloids of general Formula I,

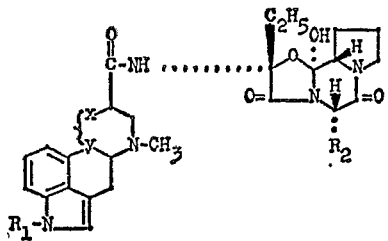

wherein

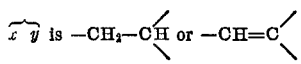 is $-CH_2-CH\big\langle$ or $-CH=C\big\langle$ $R_1$ is hydrogen or methyl, and
$R_2$ is isopropyl or isobutyl, and pharmaceutically acceptable acid addition salts thereof.

Processes for the production of compounds of general Formula I are:

(a) Compounds of general Formula I are obtained by reacting a salt of a compound of general Formula II,

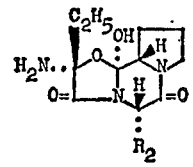

in which $R_2$ has the above significance, with a reactive, functional derivative of an acid of general Formula III,

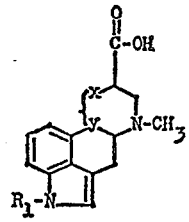

in which $R_1$ and

have the above significance, in a solvent or solvent mixture which is inert under the reaction conditions and in the presence of a basic condensation agent;

(b) Compounds of general Formula Ia,

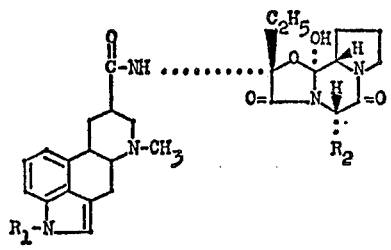

in which $R_1$ and $R_2$ have the above significance, are obtained by hydrogenating a compound of general Formula Ib,

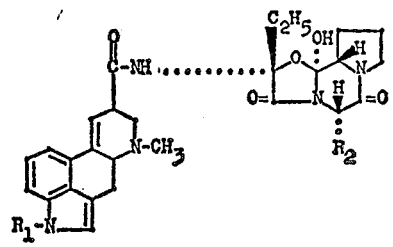

in which $R_1$ and $R_2$ have the above significance;

(c) Compound of general Formula Ic,

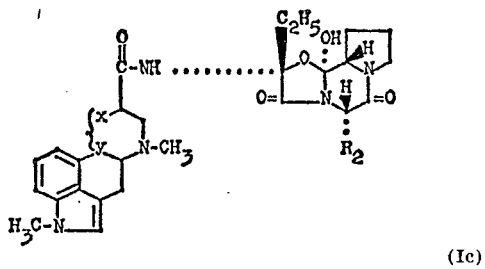

(Ic)

in which $\overset{\frown}{x\ y}$ and $R_2$ have the above significance, are obtained by methylating a compound of general Formula Id,

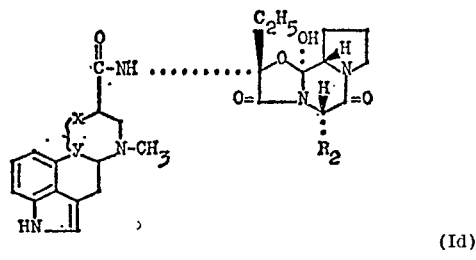

(Id)

in which $\overset{\frown}{x\ y}$ and $R_2$ have the above significance, in the presence of a strong base and in a solvent or solvent mixture which is inert under the reaction conditions.

The compounds of general Formula I obtained in accordance with the above processes are then optionally converted into their acid addition salts with inorganic or organic acids.

Suitable reactive, functional derivatives of acids of general Formula III, which may be used in the condensation of the invention in accordance with process (a), are their mixed anhydrides with sulphuric acid, their azides and, preferably, their acid chloride hydrochlorides. Examples of suitable solvents which are inert under the reaction conditions are dimehyl formamide, acetonitrile, methylene chloride and chloroform, and examples of suitable basic condensation agents are particularly tertiary organic bases, e.g. pyridine or triethylamine, and weak inorganic bases, e.g. alkali metal carbonates, pyridine being preferred. The function of the basic condensation agent is a rather complicated one and may include one or more of the following depending on the particular reactive functional acid derivative used:

(a) liberation of the aminocyclol of Formula II from its salt,
(b) binding of acid liberated in the condensation,
(c) complex formation and
(d) a solvent function.

The reaction is effected at a temperature between about —20 and +20° C., depending on the type of functional, reactive acid derivative used. Preferred temperatures for particular reactive functional acid derivatives are indicated below. In general the particular temperature adopted depends on a compromise between a low temperature favouring reduction of the tendency of the free aminocyclol of Formula II to rearrange and a higher temperature favouring the reactivity of the acid derivative. The compounds of general Formula II are used in the condensation of the invention in the form of their salts with strong inorganic or organic acids, as the compounds of Formula II are, we believe, unstable in the free form. Examples of acids suitable for salt formation are inter alia hydrochloric, hydrobromic, sulphuric, oxalic, maleic, methanesulphonic and tartaric acid.

One preferred method of effecting the process of the invention consists in that an acid chloride hydrochloride of an acid of general Formula III is reacted with a salt of a compound of general Formula II indicated above, e.g. in methylene chloride suspension, while cooling to about —15 to 0° C., in the presence of a tertiary organic base, e.g. pyridine. The reaction mixture is then optionally allowed to stand at room temperature for some time in order to complete the reaction. After the reaction is completed the resulting compound of general Formula I may be isolated from the reaction mixture in manner known per se, e.g. by diluting with the same or another solvent, washing the solution with basic wash solutions and subsequently with water, drying and concentrating the solution by evaporation and subjecting the residue to chromatography.

Another method of effecting the condensation of the invention is as follows:

The mixed anhydride of an acid of general Formula III with sulphuric acid is condensed at —15° to 0° C., in a solvent which is inert under the reaction conditions, e.g. dimethyl formamide, and in the presence of a tertiary organic base, e.g. pyridine, with a compound of general Formula II, which is used in the form of a salt indicated above, and the resulting compound of general Formula I is isolated from the reaction mixture and purified in manner known per se.

In accordance with another embodiment of the process of the invention the condensation is effected by reacting a solution of an azide of an acid of general Formula III, e.g. in the presence of a tertiary organic base, at a temperature of about 0° C. to room temperature (20° C.), in a solvent which is inert under the reaction conditions, with a compound of general Formula II in the form of a salt.

Hydrogenation of compounds of general Formula Ib may be effected catalytically or with an alkali metal in liquid ammonia. Catalytic hydrogenation is preferably effected in a solvent which is inert under the reaction conditions, e.g. ethanol, or in a solvent mixture, e.g. ethanol/methylene chloride, preferably at room temperature and normal pressure, but this hydrogenation may also be effected at an elevated temperature or pressure. Of the usual hydrogenation catalysts, the palladium catalysts are especially suitable, particularly palladium on a carrier such as aluminium oxide. After the taking up of hydrogen is completed the reaction mixture is worked up, for example by filtering off the catalyst and isolating the final products from the filtrate and purifying in manner known per se.

The methylation of the invention in accordance with process (c) is effected using as strong bases preferably alkali metal alcoholates and alkali metal amides, and as solvent which is inert under the reaction conditions, preferably liquid ammonia, or a lower amine.

One preferred method of effecting this methylation process consists in adding portionwise metallic sodium or potassium to a solution of a lower aliphatic alcohol, e.g. ethanol, in liquid ammonia, and waiting for the decolouration of the solution to occur. The compound to be methylated is added to the resulting suspension of the metal alcoholate at about —40° C. while stirring well, and after the solution has occurred methyl iodide is added. The ammonia is subsequently evaporated off in a vacuum and the residue divided between an aqueous alkali metal carbonate solution and methylene chloride, the organic phase is washed with water, dried over sodium sulphate and the methylene chloride is removed.

1 to 8 mols, preferably about 5 mols of an alkali metal alcoholate or alkali metal amide and about the same excess of methyl iodide are preferably used in this reaction for every mol of the compound to be methylated.

The new alkaloids of general Formula I produced in accordance with the invention are crystalline compounds at room temperature and with inorganic or strong organic acids form stable salts which are crystalline at room temperature. Examples of acids for salt formation are mineral acids such as hydrochloric, hydrobromic or sulphuric acid, strong organic acids such as tartaric acid, oxalic acid or methanesulphonic acid.

The compounds of general Formula Ib are named with trivial names in a manner analogous to that of other already known ergot peptide alkaloids; the alkaloids of general Formula Ia are named with the prefix "9,10-dihydro," followed by the trivial name. In the compounds of general Formula Ic the prefix "1-methyl" is placed before the name.

The compounds of Formula I, and pharmaceutically acceptable acid addition salts thereof, are useful because they possess pharmacological activity in animals. In particular, the compounds are useful in the treatment of migraine, as indicated by their serotonin antagonistic properties, e.g. in the in vitro test carried out in the isolated rat uterus [J. Pharmacol. exp. Therap. 122, 124–136 (1958)]. The serotonin antagonistic properties especially indicate suitably in interval or prophylactic treatment of migraine. Particularly the compounds of Formula I in which

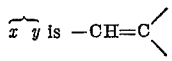

$R_1$ is hydrogen and $R_2$ has the above significance, however, are also vasoconstrictors, as indicated by their effect on the blood pressure in the spinal cat preparation [J. Physiol. (L) 41, 19 (1910)], dosages between about 1 and 5 μg./kg. having been found effective. Furthermore, compounds of Formula I in which $R_1$ is hydrogen, particularly such compounds in which

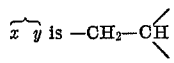

and $R_2$ has the above significance, are diuretics as indicated in the rat diureses test [Schweiz. Med. Wschr. 93, 1232–1237 (1963)] dosages between about 0.01 and 1 mg./kg. having been found effective. The compounds which are vasoconstrictors are especially suitable for treatment of attacks of migraine and also circulatory disorders. The compounds which are diuretics and vasoconstrictors are further particularly suitable for treatment of attacks of migraine where disturbances of electrolyte and water balance are involved. For use in the treatment of migraine, the dosage to be administered will of course depend on the compound employed, the mode of administration and the treatment desired. However, in general, the compounds may be employed in a manner similar to ergot alkaloids known for this treatment. Thus, in general, satisfactory results are obtained at daily dosages between about 0.0003 and about 2 milligrams per kilogram animal body weight. For the larger mammals, the total daily dosage is in the range of from about 0.2 to about 10 milligrams, conveniently given in divided doses 2 to 3 times a day or in sustained release form. Dosage forms particularly include tablets, solutions and ampoules; for example a unit dosage form for oral administration comprises from about 0.06 to about 5 milligrams of the compound, admixed with a solid or liquid pharmaceutical carrier of diluent.

The compounds may be used as pharaceuticals on their own or in the form of appropriate medicinal preparations for administration, e.g. orally, enterally or parenterally. In order to produce suitable medicinal preparations, the compounds may be combined with pharmaceutically acceptable adjuvants. Examples of such adjuvants are:

for tablets and dragées: lactose, starch, talcum, stearic acid, etc.
for injectable solutions: water, alcohols, glycerin, vegetable oils, etc.
for suppositories: natural or hardened oils, waxes, etc.

The preparations may furthermore contain suitable preserving, stabilizing and wetting agents, solubilizers, sweetening and colouring substances and flavourings.

The compounds of general Formula II used as starting materials are new and are, we believe, only stable in the form of their salts.

The compounds of the general Formula II may be produced by ethylating 2-benzyloxymalonic acid diethyl ester or by benzylating 2-hydroxy-2-ethylmalonic acid diethyl ester, selectively saponifying the resulting 2-benzyloxy-2-ethylmalonic acid diethyl ester to give 2-benzyloxy-ethylmalonic acid monoethyl ester, converting this to 2-benzyloxy-2-ethylmalonic acid chloride monoethyl ester or 2-benzyloxy-2-ethylmalonic acid bromide monoethyl ester, which is condensed with compounds of general Formula IV,

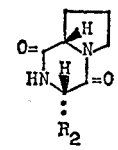

IV in which $R_2$ has the above significance, the benzyl radical is split off hydrogenolytically from the resulting compounds of general Formula V,

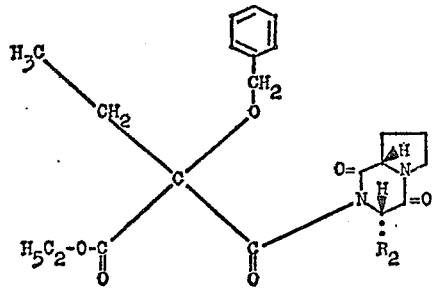

V in which $R_2$ has the above significance, whereby a spontaneous stereospecific ring closure occurs to give compounds of general Formula VI,

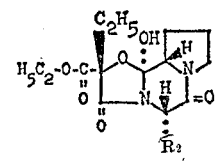

VI in which $R_2$ has the above significance, these are saponified to give compounds of general Formula VII,

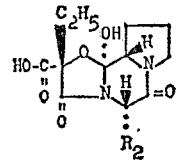

VII in which $R_2$ has the above significance, the compounds of general Formula VII are converted into compounds of general Formula VIII,

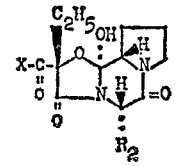

VIII in which $R_2$ has the above significance, and

X signifies chlorine or bromine, these are reacted with sodium azide to give the acid azides of general Formula IX,

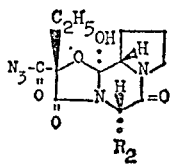

in which $R_2$ has the above significance, these are either heated with an aqueous acid, e.g. a small excess of water and hydrochloric acid, or are reacted with benzyl alcohol, and the benzyloxycarbonyl radical is hydrogenolytically split off in acid solution from the resulting urethanes of general Formua X,

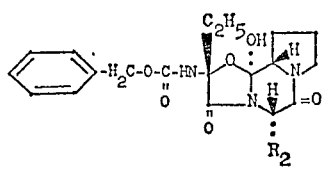

in which $R_2$ has the above significance, to give the compounds of general Formula II in the form of the corresponding salts. The configuration established for the C atom in the 2 position in general Formula II is obtained during the steps of synthesis leading from 2-benzyloxy-2-ethylmalonic acid diethyl ester to the compounds of general Formula II, by separating the stereoisomers either in the stage of 2-benzyloxy-2-ethylmalonic acid monoethyl ester with an optically active base, or in the stage of the compounds of general Formulae V, VI or X by chromatography.

Ethylation of 2-benzyloxymalonic acid diethyl ester is effected in the presence of a strong base, e.g. an alkali metal hydride, an alkali metal amide or an alkali metal alcoholate, preferably in a solvent which is inert under the reaction conditions, with reagents such as diethyl sulphate, ethyl iodide or ethyl bromide. Benzylation of 2-hydroxy-2-ethylmalonic acid diethyl ester is effected in the presence of a strong base, e.g. an alkali metal hydride, alkali metal amide or alkali metal alcoholate in a polar solvent which is inert under the reaction conditions, e.g. dimethyl acetamide or dimethyl sulphoxide, with a benzylating agent, e.g. a benzyl halide, p-toluenesulphonic acid benzyl ester or m-nitrobenzenesulphonic acid benzyl ester.

The resulting 2-benzyloxy-2-ethylmalonic acid diethyl ester is preferably saponified with a solution of an alkali metal hydroxide in a lower aliphatic alcohol to give 2-benzyloxy-2-ethylmalonic acid monoethyl ester. This malonic acid monoethyl ester may be separated into its optical isomers by reacting the racemic malonic acid monoethyl ester with an optically active base, e.g. with pseudoephedrine or cinchonidine, to form a mixture of diastereoisomers, which is separated by fractional crystallization into the two diastereoisomers, from which the two optically active 2 - benzyloxy - 2 - ethylmalonic acid monoethyl esters may be obtained in manner known per se.

2-benzyloxy-2-ethylmalonic acid monoethyl ester is converted into the required acid halide with chlorinating or brominating agents, optionally in a solvent which is inert under the reaction conditions, in the presence of an N-di-(lower)alkyl substituted acid amide of an aliphatic monocarboxylic acid having 1 to 3 carbon atoms. Examples of suitable solvents for this reaction are chloroform, methylene chloride or the N-di(lower)alkyl substituted acid amide itself.

The resulting 2-benzyloxy-2-ethylmalonic acid halide monoethyl ester is condensed in the presence of a tertiary amine, e.g. pyridine, triethylamine, N-ethyl-diisopropyl-amine or N-methylmorpholine, at about 20–80° C. with compounds of general Formula IV. This condensation may be effected in the presence of a solvent which is inert under the reaction conditions, e.g. dioxane, or without solvent. The benzyl radical is split off from the resulting acylation product of general Formula V by hydrogenolysis, e.g. by catalytic hydrogenation at normal pressure and a temperature between 10 and 80° C., in a solvent which is inert under the reaction conditions, e.g. a lower alcohol, ethyl acetate or a mixture of glacial acetic acid and water, with the use of palladium/active charcoal or Raney nickel as catalyst, whereby a stereospecific ring closure (relative to the C atom in the 10b position) occurs spontaneously to give compounds of general Formula VI.

A separation of the diastereoisomers may also be effected in the stage of the compounds of general Formulae V, VI or X by chromatography, e.g. on silica gel, whereby methylene chloride with different contents of methanol may, for example, be used as eluant.

The compounds of general Formula VI are saponified, e.g. with dilute aqueous sodium hydroxide, at room temperature to give the free acids of general Formula VII; these are converted into the acid chlorides of general Formula VIII, e.g. with freshly sublimated phosphorus pentachloride at room temperature, or in the form of their sodium salts by reacting with oxalyl chloride in a solvent which is inert under the reaction conditions, e.g. ether or mixtures of petroleum ether/ether. The compounds of general Formula VIII are reacted in manner known per se with sodium azide to give compounds of general Formula IX, which after rearrangement to the isocyanate with benzyl alcohol in an inert solvent, e.g. chloroform, yield the corresponding urethanes of Formula X. The benzyloxycarbonyl radical may be split off, e.g. by hydrogenation with palladium/active charcoal at room temperature in acid solution, whereby the compounds of general Formula II are obtained in the form of the corresponding salts.

Hydrochlorides of compounds of general Formula II may, however, also be obtained by heating azides of general Formula IX in a solvent which is inert under the reaction conditions and in which the salts of the compounds of general Formula II are sparingly soluble, e.g. dimethoxy-ethane, with approximately the theoretical amount of hydrochloric acid and water.

Insofar as the production of the required starting materials is not described, these are known or may be produced in accordance with known methods or in a manner analogous to the processes described in the examples.

The invention is illustrated, but in no way limited by the following examples in which all temperatures are indicated in degrees centigrade and are uncorrected.

The pK determinations were effected in the system methyl Cellosolve/water in a volume ratio 80:20.

EXAMPLE 1

Ergonine 7.9 cc. of absolute pyridine are added dropwise during the course of 15 minutes to a stirred suspension cooled to −10° of 3.3 g. of (2R,5S,10aS,10bS)-2-amino-2-ethyl-5-isopropyl-3,6-dioxo - 10b - hydroxyoctahydro - 8H - oxazolo[3,2-a]pyrrolo[2,1-c]pyrazine hydrochloride and 6 g. of d-lysergic acid chloride hydrochloride in 40 cc. of absolute methylene chloride at such a rate that the same temperature is maintained. The brown suspension is then stirred for a further 30 minutes at 0° and subsequently for 3 hours at 20°. Working up is effected by diluting with 100 cc. of methylene chloride and shaking out with 100 cc. of a 2 N aqueous soda solution. Extraction is again effected thrice with 50 cc. of methylene chloride containing 5% of pyridine, the combined organic phases are washed once with 50 cc. of a 10% common salt solution and are dried over sodium sulphate. After distilling off the solvent in a vacuum at a bath temperature of 60° the pyridine which is still present is removed by digesting the residue twice with 40 cc. amounts of warm toluene and subsequently distilling off. The resulting light brown foam is dried at 60° in a high vacuum for 1 hour and is chromatographed on a 50-fold quantity of aluminium oxide (activity II–III). Ergoninine is eluted with 0.1% methanol in methylene chloride and is obtained from methanol in the form of colourless prisms having a decomposition point of 206–207°. (After recrystallizing twice from methylene chloride/methanol the decomposition point rises to 219–220°.) $[\alpha]_D^{20} = +424°$ (c.=1, chloroform).

Ergonine is eluted with 0.5% methanol in methylene chloride and is crystallized from ethanol. Decomposition point 207–208°, $[\alpha]_D^{20} = -182°$ (c.=1, chloroform).

Bimaleate: From ethanol, decomposition point 183–185°, $[\alpha]_D^{20} = +88°$ (c.=1, pyridine).

The (2R,5S,10aS,10bS)-2-amino - 2 - ethyl-5-isopropyl-3,6 - dioxo - 10b - hydroxy - octahydro-8H-oxazolo[3,2-a]pyrrolo[2,1-c]pyrazine hydrochloride used as starting material is produced as follows:

(a) (3S,8aS,αS)-2-(α - ethoxycarbonyl-α-benzyloxybutyryl) - 3 - isopropyl - 1,4 - dioxo-octahydro-pyrrolo[1,2-a]pyrazine A mixture of 19.6 g. of (3S,8aS)-1,4-dioxo-3-isopropyl-octahydro-pyrrolo[1,2-a]pyrazine, 15 cc. of absolute pyridine, 28.5 g. of S(+)-2-ethyl-2-benzyloxy-malonic acid chloride monoethyl ester and 12 cc. of dioxane is stirred at room temperature for 1 hour and subsequently at 75° for 1½ hours. After cooling the reaction mixture is diluted with 700 cc. of ether, is shaken with ice-cold 2 N hydrochloric acid, is washed with an aqueous sodium bicarbonate solution and dried over sodium sulphate. After distilling off the solvent at reduced pressure at a bath temperature of 50° a reddish, viscous oil is obtained, which may be immediately worked up.

(b) (2R,5S,10aS,10bS) - 2 - ethoxycarbonyl-2-ethyl-5-isopropyl-3,6-dioxo - 10b - hydroxy-octahydro-8H-oxazolo[3,2-a]pyrrolo[2,1-c]pyrazine (3S,8aS,αS) - 2 - (α-ethoxycarbonyl-α-benzyloxybutyryl)-3-isopropyl - 1,4 - dioxo-octahydro-pyrrolo[1,2-a]pyrazine is hydrogenated in 800 cc. of 70% aqueous acetic acid on 10 g. of a prehydrogenated palladium/charcoal catalyst (5% Pd) at room temperature and normal pressure. After about 20 hours the taking up of hydrogen is completed. Working up is effected by filtering off the catalyst and concentrating the filtrate as far as possible in a vacuum at 50°. The residue is chromatographed on a 20-fold quantity of silica gel. (2R,5S,10aS,10bS)-2-ethoxycarbonyl - 2 - ethyl - 5 - isopropyl-3,6-dioxo-10b-hydroxy-octahydro - 8H - oxazolo[3,2-a]pyrrolo[2,1-c]pyrazine is eluted with 1% methanol in methylene chloride and is obtained from isopropyl ether in colourless crystals having an M.P. of 90–93°.

After recrystallizing once the analytically pure (2R,5S,10aS,10bS) - 2 - ethoxycarbonyl - 2-ethyl-5-isopropyl-3,6-dioxo - 10b - hydroxy-octahydro - 8H - oxazolo[3,2-a]pyrrolo[2,1-c]pyrazine has an M.P. of 94–95° $[\alpha]_D^{20} = +0.8°$ (c.=2, ethanol), $pK_{MCS} = 11.1$.

(c) (2R,5S,10aS,10bS)-2-carboxy - 2 - ethyl-5-isopropyl-3,6-dioxo - 10b - hydroxy-octahydro-8H-oxazolo[3,2-a]pyrrolo[2,1-c]pyrazine 35.4 g. of (2R,5S,10aS,10bS)-2-ethoxycarbonyl-2-ethyl-5-isopropyl - 3,6 - dioxo - 10b - hydroxy-octahydro-8H-oxazolo[3,2-a]pyrrolo[2,1-c]pyrazine are dissolved in 150 cc. of a 1 N aqueous sodium hydroxide solution and the solution is stirred at room temperature for 2 hours. The slightly turbid solution is shaken out once with ethyl acetate, is then distinctly acidified with 2 N ice-cold hydrochloric acid and is immediately exhaustively extracted 4 times with 300 cc. amounts of ethyl acetate. The combined organic phases are dried over sodium sulphate and concentrated in a vacuum at a bath temperature of 30°, whereby (2R,5S,10aS,10bS)-2-carboxy - 2 - ethyl-5-isopropyl-3,6-dioxo - 10b - hydroxy - octahydro-8H-oxazolo[3,2-a]pyrrolo[2,1-c]pyrazine is obtained with 1 mol of ethyl acetate of crystallization in the form of colourless crystals having a decomposition point of 154–155°. The solvent-free acid may be obtained after reprecipitating once from ethyl acetate/n-heptane. Decomposition point 147–148°, $[\alpha]_D^{20} = -2.2°$ (c.=2, pyridine), $pK_1 = 3.92$ in MCS, $pK_2 = 12.4$ in MCS.

(d) (2R,5S,10aS,10bS) - 2 - chloroformyl - 2 - ethyl-5-isopropyl-3,6-dioxo - 10b - hydroxy-octahydro-8H-oxazolo[3,2-a]pyrrolo[2,1-c]pyrazine 32.6 g. of (2R,5S,10aS,10bS)-2-carboxy-2-ethyl-5-isopropyl - 3,6 - dioxo - 10b - hydroxy-octahydro-8H-oxazolo[3,2-a]pyrrolo[2,1-c]pyrazine are added to a solution cooled to 0° of 23.1 g. of freshly sublimated phosphorus pentachloride in 500 cc. of absolute ether and the mixture is stirred at room temperature for 90 minutes. After the addition of 700 cc. of absolute petroleum ether crystallization is completed by allowing the mixture to stand at a temperature between 0° and −10° for 1 hour. After filtering off the crystalline, colourless (2R,5S,10aS,10bS)-2-chloroformyl - 2-ethyl-5-isopropyl-3,6-dioxo-10b-hydroxy-octahydro-8H-oxazolo[3,2-a]pyrrolo[2,1-c]pyrazine is obtained; this compound is very sensitive to moisture and must be worked up immediately.

(e) (2R,5S,10aS,10bS)-2-azidocarbonyl - 2 - ethyl-5-isopropyl-3,6-dioxo-10b-hydroxy-octahydro - 8H - oxazolo[3,2-a]pyrrolo[2,1-c]pyrazine 34.4 g. of (2R,5S,10aS,10bS)-2-chloroformyl-2-ethyl-5-isopropyl-3,6-dioxo-10b-hydroxy-octahydro - 8H - oxazolo[3,2-a]pyrrolo[2,1-c]pyrazine are dissolved in 500 cc. of absolute methylene chloride, the solution is cooled to 0° and after covering with a layer of a cold solution of 15 g. of sodium azide in 70 cc. of water vigorous vibration is effected for 4 minutes. After the addition of 100 cc. of a saturated potassium hydrogen carbonate solution vibration is effected at 0° for a further minute and after separating in a separating funnel the aqueous phase is again extracted twice with 300 cc. of methylene chloride. The combined organic phases are dried over sodium sulphate and concentrated at a bath temperature of 20° in a vacuum to a yellowish foam which is immediately worked up.

(f) (2R,5S,10aS,10bS) - 2 - benzyloxycarbonylamino-2-ethyl - 5 - isopropyl-3,6-dioxo-10b-hydroxy-octahydro-8H-oxazolo[3,2-a]pyrrolo[2,1-c]pyrazine Crude (2R,5S,10aS,10bS)-2-azidocarbonyl - 2 - ethyl-5-isopropyl - 3,6 - dioxo-10b-hydroxy-octahydro-8H-oxazolo[3,2-a]pyrrolo[2,1-c]pyrazine is dissolved in 400 cc. of absolute chloroform and the solution is heated under reflux for 15 minutes. After the addition of 30 cc. of benzyl alcohol the reaction mixture is heated under reflux for a further 45 minutes and is concentrated as far as possible at reduced pressure, finally in a high vacuum at 80°. The partially crystalline residue is taken up in 100 cc. of ethyl acetate, and after allowing to stand at 0° for 1 hour, filtration is effected. Analytically pure (2R,5S,10aS,10bS)-2-benzyloxycarbonylamino - 2 - ethyl-5-isopropyl-3,6-dioxo - 10b - hydroxy-octahydro-8H-oxazolo[3,2-a]pyrrolo[2,1-c]pyrazine is thus obtained in the form of a finely crystalline white powder having a decomposition point of 216–218°. $[\alpha]_D^{20} = +40.2°$ (c.=1, ethanol), $= +41°$ (c.=1, chloroform).

(g) (2R,5S,10aS,10bS)-2-amino - 2 - ethyl - 5 - isopropyl-3,6-dioxo - 10b - hydroxy-octahydro-8H-oxazolo[3,2-a]pyrrolo[2,1-c]pyrazine hydrochloride 43.1 g. of (2R,5S,10aS,10bS) - 2 - benzyloxycarbonyl-amino-2-ethyl - 5 - isopropyl-3,6-dioxo-10b-hydroxy-octahydro-8H-[3,2-a]pyrrolo[2,1-c]pyrazine are taken up in 800 cc. of absolute tetrahydrofuran in which 4.2 g. of hydrochloric acid gas have been dissolved, and hydrogenation is effected on 25 g. of a prehydrogenated palladium/charcoal catalyst (10% Pd) at room temperature and normal pressure. After about 40 minutes the taking up of hydrogen is completed. The catalyst is filtered off (the filtrate may be discarded) and is washed in several portions with a total of 1 liter of methylene chloride/methanol (1:1). The eluate is concentrated at a bath temperature of 20° in a vacuum to a yellowish foam, which is taken up in 300 cc. of absolute dimethoxy-ethane; after scratching and allowing to stand at a temperature between 0° and −10° for 30 minutes (2R,5S,10aS,10bS)-2-amino - 2 - ethyl - 5 - isopropyl-3,6-dioxo-10b-hydroxy-octahydro - 8H - oxazolo[3,2-a]pyrrolo[2,1-c]pyrazine hydrochloride is obtained in the form of yellowish, fine crystals having a decomposition point of 172–173°. The compound is sufficiently pure for working up and cannot be recrystallized without decomposition. $[\alpha]_D^{20} = +17°$ (c.=0.9, methylene chloride/methanol=1:1).

EXAMPLE 2

9,10-dihydro-ergonine 20 cc. of absolute pyridine are added dropwise to a stirred suspension, cooled to −15°, of 6 g. of 9,10-dihydro-lysergic acid chloride hydrochloride in 30 cc. of absolute acetonitrile and 30 cc. of dimethyl formamide at such a rate that the same temperature is maintained. 3.3 g. of (2R,5S,10aS,10bS)-2-amino-2-ethyl-isopropyl-3,6 - dioxo - 10b - hydroxy-octahydro-8H-oxazolo[3,2-a]pyrrolo[2,1-c]pyrazine hydrochloride are then added while stirring well to the resulting thick brown mash and the reaction temperature is raised to 0° during the course of 1½ hours. The reaction mixture is carefully decomposed with 40 cc. of 2 N hydrochloric acid while cooling well, is poured into 200 cc. of a 2 N aqueous soda solution and the precipitated 9,10-dihydro-ergonine is extracted 5 times with 200 cc. amounts of methylene chloride containing 10% of ethanol. The combined organic phases are washed once with 100 cc. of an aqueous ammonia solution and once with an aqueous common salt solution, are dried over sodium sulphate and decolourized with 1 g. of active charcoal. After distilling off the solvent the residue is taken up twice in 40 cc. amounts of toluene and the pyridine which is still present is removed azeotropically by distillation. The residue is chromatographed on a 30-fold quantity of aluminium oxide (activity II–III), whereby 9,10-dihydro-ergonine is eluted with 0.6% of methanol in methylene chloride. After crystallizing from acetone and drying at 100° in a high vacuum for 3 hours the compound still contains ½ mol of methylene chloride. Decomposition point 245–247°, $[\alpha]_D^{20} = +3.8°$ (c.=1, methanol).

Hydrochloride: From methanol/ether, decomposition point 244–245°, $[\alpha]_D^{20} = +26.1°$ (c.=1, methylene chloride/methanol=1:1).

EXAMPLE 3

1-methyl-ergonine 3.67 g. of metallic potassium are carefully added to a solution of 8.2 cc. of absolute ethanol in 500 cc. of liquid ammonia and the resulting blue solution is decolourized with a further 6.3 cc. of absolute ethanol. 10 g. of ergonine are then dissolved in the resulting solution while stirring vigorously and a solution of 13.0 g. of methyl iodide in 10 cc. of ether is rapidly added dropwise at −40 to −50°. The brown reaction mixture is stirred at this temperature for a further 90 minutes and the liquid ammonia is sucked off in a water jet vacuum by careful heating. The yellow, powdery residue is diluted with water and extracted 4 times with 200 cc. amounts of methylene chloride. The combined organic extracts are dried over sodium sulphate with the addition of active charcoal and are carefully concentrated in a vacuum after filtration over Hyflo. The residue is taken up in 60 cc. of 90% aqueous acetone, whereby 1-methyl-ergonine crystallizes with a purity of about 99%. The crystals are obtained in analytically pure form by dissolving the same in acetone, adding water dropwise and scratching. Decomposition point 155–157° (dried in a high vacuum at 100° for 4 hours). $[\alpha]_D^{20} = -16.9°$ (c.=1, pyridine).

Bitartrate: From absolute ethanol, decomposition point 175–178°, $[\alpha]_D^{20} = +80.5°$ (c.=1, methanol).

EXAMPLE 4

1-methyl-9,10-dihydro-ergonine 5.62 g. of 1-methyl-ergonine are dissolved in 100 cc. of ethanol with the addition of a small amount of methylene chloride and hydrogenation is effected on 3 g. of palladium on aluminium oxide (5% palladium) under normal pressure and at room temperature. After four hours 230 cc. of hydrogen have been taken up. The catalyst is filtered off, washing is effected with methylene chloride, the filtrate is concentrated to a foam and the compound of the heading is crystallized from ethyl acetate. M.P. 205–208° (decomp.), $[\alpha]_D^{20} = -55°$ (c.=1, pyridine).

EXAMPLE 5

9,10-dihydro-ergoptine 20 cc. of absolute pyridine are added dropwise to a stirred suspension, cooled to −15°, of 6 g. of 9,10-dihydro-lysergic acid chloride in 30 cc. of absolute acetonitrile and 30 cc. of dimethyl formamide, at such a rate that the same temperature is maintained. 3.44 g. of (2R,5S,10aS,10bS) - 2 - amino - 2 - ethyl-5-isobutyl-3,6-dioxo-10b-hydroxy-octahydro - 8H - oxazolo[3,2 - a]pyrrolo[2,1-c]pyrazine hydrochloride are then added to the resulting thick mash while stirring well, whereby the reaction temperature is raised to 0° during the course of 1½ hours. The reaction mixture is decomposed with 40 cc. of 2 N hydrochloric acid while cooling well, is poured into 200 cc. of a 2 N aqueous soda solution and the precipitated 9,10-dihydro-ergoptine is extracted 5 times with 200 cc. amounts of methylene chloride containing 10% of ethanol. The combined organic phases are washed once with 100 cc. of an aqueous ammonia solution and once with an aqueous common salt solution, are dried over sodium sulphate and decolourized with 1 g. of active charcoal. After distilling off the solvent the residue is taken up twice in 40 cc. of toluene and the pyridine which is still present is removed azeotropically by distillation. The residue is chromatographed on a 30-fold quantity of aluminium oxide (activity II–III), whereby 9,10-dihydro-ergoptine is eluted with 0.6% of methanol in methylene chloride. After crystallization from ethanol and subsequent precipitation from ethyl acetate by the addition of ether, 9,10-dihydro-ergoptine is obtained. After drying in a high vacuum at 100° for 4 hours: decomposition point 218–220°, $[\alpha]_D^{20} = +4.5°$ (c.=0.75, methylene chloride/methanol=1:1).

Hydrochloride: From ethanol/ether: decomposition point 225–226°, $[\alpha]_D^{20} = +17.6°$ (c.=0.5, methylene chloride/methanol=1:1).

EXAMPLE 6

Ergoptine 7.9 cc. of absolute pyridine are added dropwise during the course of 15 minutes to a stirred suspension, cooled to −10°, of 3.44 g. of (2R,5S,10aS,10bS)-2-amino-2-ethyl-5-isobutyl - 3,6 - dioxo-10b-hydroxy-octahydro-8H-oxazolo[3,2-a]pyrrolo[2,1-c]pyrazine hydrochloride and 6 g. of d-lysergic acid chloride hydrochloride in 40 cc. of absolute methylene chloride, at such a rate that the same temperature is maintained. The resulting brown reaction mixture is subsequently stirred for a further 30 minutes at 0° and for 3 hours at room temperature. Working up is effected by diluting with 100 cc. of methylene chloride and shaking out with 100 cc. of a 2 N aqueous soda solution. Extraction is then again effected thrice with 50 cc. amounts of methylene chloride containing 5% of pyridine, the combined organic phases are washed once with 50 cc. of a 10% common salt solution and are dried over sodium sulphate. After distilling off the solvent in a vacuum at 60° the pyridine which is still present is removed by digesting the residue twice with 40 cc. amounts of warm toluene and subsequently distilling off. The resulting brown foam is dried in a high vacuum at 60° for 1 hour and is chromatographed on a 50-fold quantity of aluminium oxide (activity II–III). Ergoptinine is eluted with 0.1% of methanol in methylene chloride and crystallizes from methanol in small, colourless plates having a decomposition point of 198–200° (black colouration above 193°). $[\alpha]_D^{20} = +408°$ (c.=0.5, chloroform).

Ergoptine is eluted with 0.5% methylene chloride and crystallizes from 70% aqueous acetone in the form of light beige prisms. After drying in a high vacuum at 100° for 4 hours: decomposition point 198–200°, $[\alpha]_D^{20} = -180°$ (c.=1, chloroform).

Bimaleate monohydrate: From ethanol, decomposition point 176–178°, $[\alpha]_D^{20} = +100.5°$ (c.=1, methylene chloride/methanol=1:1).

The (2R,5S,10aS,10bS) - 2 - amino-2-ethyl-5-isobutyl-3.6 - dioxo-10b-hydroxy-octahydro-8H-oxazolo[3,2-a]pyrrolo[2,1-c]pyrazine hydrochloride used as starting material is produced as follows:

(a) (3S,8aS,αS) - 2 - (α - ethoxycarbonyl-α-benzyloxybutyryl)-3-isobutyl - 1,4 - dioxo-octahydro-pyrrolo[1,2-α]pyrazine 34 g. of S(+)-2-ethyl-2-benzyloxy-malonic acid chloride monoethyl ester are added dropwise during the course of 5 minutes to a stirred suspension, heated to 70°, of 21.0 g. of (3S,8aS)-1,4-dioxo-3-isobutyl-octahydro-pyrrolo[1,2-a]pyrazine in 50 cc. of absolute dioxane and 17.4 g. of N-ethyl-di-isopropylamine and the reaction mixture is stirred for a further 2½ hours at this temperature. The reaction mixture is subsequently diluted with 600 cc. of ether, is washed twice with 100 cc. amounts of ice-cold 2 N hydrochloric acid, once with 100 cc. of ice water and once with 100 cc. of a saturated aqueous sodium bicarbonate solution. The combined organic phases are dried over sodium sulphate and after distilling off the solvent in a vacuum at 50° yield (3S,8aS,αS)-2-(α-ethoxycarbonyl-α-benzyloxybutyryl) - 3 - isobutyl-1,4-dioxo-octahydro-pyrrolo[1,2-a]pyrazine as an oil which is immediately worked up.

Pure (3S,8aS)-1,4-dioxo-3-isobutyl-octahydro - pyrrolo [1,2-a]-pyrazine, having an M.P. of 164–165°, may be recovered from the combined aqueous phases by extracting with methylene chloride, drying over sodium sulphate, distilling off the solvent and subsequently crystallizing from acetone.

(b) (2R,5S,10aS,10bS) - 2 - ethoxycarbonyl-2-ethyl-5-isobutyl - 3,6 - dioxo-10b-hydroxy-octahydro-8H-oxazolo [3,2-a]pyrrolo[2,1-c]pyrazine (3S,8aS,αS) - 2 - (α - ethoxycarbonyl - α - benzyloxybutyryl) - 3 - isobutyl-1,4-dioxo-octahydro-pyrrolo[1,2-a] pyrazine is hydrogenated at 50° under normal pressure on 20 g. of a palladium/charcoal catalyst (10% Pd) in 800 cc. of undenatured alcohol. After 4 to 6 hours the taking up of hydrogen is completed. The catalyst is filtered off and the filtrate evaporated on a rotary evaporator at 50°. The residue is taken up in 100 cc. of isopropyl ether, whereby a portion of pure (2R,5S,10aS,10bS)-2-ethoxycarbonyl - 2 - ethyl-5-isobutyl-3,6-dioxo-10b-hydroxy-octahydro - 8H - oxazolo[3,2-a]pyrrolo[2,1-c]pyrazine, having an M.P. of 94–95°, is already obtained. The filtrate is again concentrated and chromatographed on a 20-fold quantity of silica gel. The yield of pure (2R,5S, 10aS,10bS)-2-ethoxycarbonyl - 2 - ethyl-5-isobutyl-3,6-dioxo-10b-hydroxy-octahydro - 8H - oxazolo[3,2-a]pyrrolo[2,1-c]pyrazine, having an M.P. of 94–96°, may be considerably improved by elution with 1% of methanol in methylene chloride and subsequent crystallization. $[\alpha]_D^{20} = -3.5°$ (c.=1, methylene chloride), $pK_{MCS} = 10.8$.

(c) (2R,5S,10aS,10bS) - 2 - carboxy-2-ethyl-5-isobutyl-3,6 - dioxo - 10b - hydroxy - octahydro-8H-oxazolo [3,2-a]pyrrolo[2,1-c]pyrazine 36,8 g. of (2R,5S,10aS,10bS) - 2 - ethoxycarbonyl-2-ethyl - 5 - isobutyl-3,6-dioxo-10b-hydroxy-octahydro-8H-oxazolo[3,2-a]pyrrolo[2,1-c]pyrazine are dissolved in 150 cc. of a 1 N aqueous sodium hydroxide solution and the solution is stirred at room temperature for 2 hours. After cooling the clear solution to 0° it is distinctly acidified with a 2 N ice-cold hydrochloric acid solution and exhaustively extracted with ethyl acetate. After washing with water, drying over sodium sulphate and concentrating the solvent to about 300 cc. in a vacuum at 30°, 300 cc. of n-hexane are added and crystallization is completed by allowing the mixture to stand at a temperature between 0 and —10° for 1 hour. After filtering off and drying the crystals at room temperature in a high vacuum for 16 hours, (2R,5S,10aS,10bS)-2-carboxy-2-ethyl-5-isobutyl - 3,6 - dioxo-10b-hydroxy-octahydro-8H-oxazolo [3,2-a]pyrrolo[2,1-c]pyrazine is obtained as monohydrate having a decomposition point of 138–140°.

The anhydrous acid may be obtained by dissolving the monohydrate in absolute ethyl acetate, allowing to stand for 2 hours over a Linde microfilter 4 A. and subsequently crystallizing by dilution with n-hexane, whereby the decomposition point is raised to 142–143°. $[\alpha]_D^{20} = -17°$ (c.=1, pyridine), $pK_{MCS} = 3.98$ and $12.3$.

(d) (2R,5S, 10aS, 10bS)-2-chloroformyl-2-ethyl-5-isobutyl-3,6-dioxo-10b-hydroxy-octahydro-8H-oxazolo[3,2-a] pyrrolo[2,1-c]pyrazine.

34.0 g. of (2R,5S,10aS, 10bS-2-carboxy-2-ethyl-5-isobutyl-3,6-dioxo - 10b - hydroxy-octahydro - 8H - oxazolo [3,2-a]pyrrolo[2,1-c]pyrazine are added to a stirred solution, cooled to 0°, of 23 g. of freshly sublimated phosphorus pentachloride in 1400 cc. of absolute ether, whereby the reaction mixture is further stirred at room temperature until a clear solution is obtained (about 1 hour). The reaction mixture is concentrated to half its volume at 20° and absolute cyclohexane is carefully added while scratching until crystallization of the acid chloride commences. After standing at a temperature between 0 and —10° for 1 hour, pure, extremely moisture-sensitive (2R,5S,10aS,10bS)-2-chloroformyl - 2 - ethyl-5-isobutyl-3,6-dioxo-10b-hydroxy-octahydro - 8H - oxazolo[3,2-a] pyrrolo[2,1-c]pyrazine, having a decomposition point of 113–115°, is obtained and must be worked up immediately.

(e) (2R,5S,10aS,10bS) - 2-azidocarbonyl-2-ethyl-5-isobutyl-3,6-dioxo-10b-hydroxy-octahydro-8H-oxazolo[3,2-a] pyrrolo[2,1-c]pyrazine.

38.6 g. of freshly crystallized (2R,5S,10aS,10bS)-2-chloroformyl-2-ethyl-5-isobutyl-3,6-dioxo - 10b - hydroxy-octahydro - 8H-oxazolo[3,2-a]pyrrolo[2,1-c]pyrazine are dissolved in 100 cc. of absolute methylene chloride at 0° and the solution is vigorously vibrated at a temperature between —5° and 0° for 4 minutes with a solution of 55 g. of sodium azide in 250 cc. of water. After the addition of 300 cc. of a saturated aqueous potassium bicarbonate solution the mixture is vibrated at this temperature for a further minute and after separating the phases extraction is again effected twice with 300 cc. of methylene chloride. The combined organic extracts are washed with ice water, dried over sodium sulphate and concentrated in a vacuum at 20°. The residue crystallizes from absolute ether/petroleum ether. Uncharacteristic M.P. with deflagration. The so-obtained (2R,5S,10aS,10bS) - 2-azidocarbonyl-2-ethyl-5-isobutyl-3,6-dioxo - 10b - hydroxy-octahydro-8H-oxazolo[3,2-a]pyrrolo[2,1-c]pyrazine is worked up immediately.

(f) (2R,5S,10aS,10bS)-2-benzyloxycarbonylamino-2-ethyl-5-isobutyl-3,6-dioxo - 10b - hydroxy-octahydro-8H-oxazolo[3,2-a]pyrrolo[2,1-c]pyrazine.

39.3 g. of freshly crystallized (2R,5S,10aS,10bS)-2-azido-carbonyl-2-ethyl-5-isobutyl - 3,6 - dioxo - 10b - hydroxy-octahydro - 8H - oxazolo[3,2-a]pyrrolo[2,1-c]pyrazine are dissolved in 750 cc. of absolute chloroform, 32 cc. of benzyl alcohol are added and the mixture is introduced as rapidly as possible in a preheated oil bath so that nitrogen evolution commences immediately. After heating to the boil under reflux for 40 minutes the solvent is distilled off and the residue liberated from excess benzyl alcohol in a high vacuum at 80°. After crystallization from ethyl acetate the already thin-chromatographically pure (2R,5S,10aS,10bS) - 2-benzyloxycarbonyl-2-ethyl-5-isobutyl-3,6-dioxo - 10b - hydroxy-octahydro-8H-oxazolo[3,2-a]pyrrolo[2,1-c]pyrazine is obtained as a finely crystalline powder having a decomposition point of 212–214°. $[\alpha]_D^{20} = -2.8°$ (c.=2, methylene chloride).

(g) (2R,5S,10aS,10bS-2-amino - 2 - ethyl-5-isobutyl-3,6-dioxo-10b-hydroxyoctahydro - 8H - oxazolo[3,2-a]pyrrolo[2,1-c]pyrazine hydrochloride.

A solution of 44.5 g. of (2R,5S,10aS,10bS)-2-benzyloxycarbonylamino-2-ethyl - 5 - isobutyl-3,6-dioxo-10b-hydroxy-octahydro - 8H - oxazolo[3,2-a]pyrrolo[2,1-c]pyrazine in 480 cc. of absolute tetrahydrofuran in which 120 millimols of hydrochloric acid gas have been dissolved, is added dropwise to a suspension of 30 g. of predrogenated palladium/charcoal catalyst (10% Pd) in 400 cc. of absolute tetrahydrofuran. Hydrogenation is subsequently effected at room temperature and normal pressure. After 40 minutes about 2 liters of hydrogen have been taken up and hydrogenation is completed. The catalyst is then filtered off and the filtrate discarded. The catalyst is washed out well in several fractions of methylene chloride/methanol (1:1) and the filtrate is concentrated to a yellow foam in a vacuum at 20°. (2R,5S,10aS,10bS)-2-amino-2-ethyl-5-isobutyl - 3,6 - dioxo-10b-hydroxy-octahydro-8H - oxazolo[3,2-a]pyrrolo[2,1-c]pyrazine hydrochloride crystallizes from dimethoxy-ethane and after drying over night in a high vacuum still contains about ¼ mol of dimethoxy-ethane of crystallization. Decomposition point 181–182°.

EXAMPLE 7

9,10-dihydro-ergoptine 5.62 g. of ergoptine are dissolved in 50 cc. of methylene chloride/methanol (1:1 and hydrogenation is effected on 2.5 g. of prehydrogenated palladium on aluminium oxide in 15 cc. of ethanol at room temperature and normal pressure. After 2 hours 220 cc. of hydrogen have been taken up and hydrogenation is completed. The catalyst is filtered off, washing is effected with methylene chloride, the filtrate is concentrated to a foam and 9,10-dihydro-ergoptine is crystallized from ethyl acetate/ether. After drying in a high vacuum at 100° for 4 hours: decomposition point 218–220°, $[\alpha]_D^{20} = +4.5°$ (c.=0.75, methylene chloride/methanol=1:1).

Hydrochloride: From ethanol/ether: decomposition point 225–226°, $[\alpha]_D^{20} = +17.6°$ (c.=0.5, methylene chloride/methanol=1:1).

EXAMPLE 8

1-methyl-ergoptine

A solution of 4.6 cc. of absolute ethanol in 6 cc. of absolute ether is added dropwise to a solution of 1.16 g. of sodium metal in 100 cc. of liquid ammonia while stirring during the course of 20 minutes, whereby the initially dark blue solution decolourizes. 5.62 g. of dry ergoptine are subsequently added, stirring is effected for a further 15 minutes until the ergoptine is completely dissolved, and 7.10 g. of methyl iodide in 6 cc. of absolute ether are added dropwise at −40° during the course of 5 minutes. After stirring at the same temperature for 1½ hours the clear solution is carefully heated and the ammonia sucked off in a partial vacuum. The resulting yellow residue is extracted 4 times with a mixture of 100 cc. of methylene chloride and 100 cc. of concentrated aqueous sodium bicarbonate solution. After drying the combined organic phases and distilling off the solvent at 50° the residue is taken up and crystallized in 50 cc. of methanol, whereby thin-chromatographically pure 1-methyl-ergoptine, having a decomposition point of 210–211°, is obtained. $[\alpha]_D^{20} = -211°$ (c.=0.5, methylene chloride).

EXAMPLE 9

1-methyl-9,10-dihydro-ergoptine 0.9 g. of sodium are carefully added to 100 cc. of liquid ammonia while cooling well and stirring vigorously. The resulting blue solution is decolourized by the dropwise addition of 4 cc. of absolute ethanol, 4.3 g. of 9,10-dihydro-ergoptine are subsequently added, and the fluorescing solution is stirred at −40° for 15 minutes. After the dropwise addition of 5.4 g. of methyl iodide in 5 cc. of absolute ether the mixture is allowed to react for a further 30 minutes, the ammonia is evaporated off and the residue is shaken out several times between a 2 N sodium carbonate solution and methylene chloride until a Keller's colour reaction in the organic phase is negative. The combined organic phases are dried over sodium sulphate and concentrated in a rotary evaporator in a vacuum. After crystallizing from ethyl acetate and recrystallizing twice from a mixture of ethyl acetate/methylene chloride and subsequently concentrating in a vacuum the compound of the heading is obtained in pure form. M.P. 232–234° (decomp.), $[\alpha]_D^{20} = -41°$ (c.=1, pyridine).

The S-(+)-2-ethyl-2-benzyloxy-malonic acid chloride monoethyl ester used as starting material in the processes of Examples 1a and 6a may be produced as follows:

(a) 2-ethyl-2-benzyloxy-malonic acid diethyl ester (method 1)

200 cc. of dimethylacetamide and 11.5 g. of a sodium hydride dispersion are placed in a sulphonating flask provided with a stirrer, thermometer, calcium chloride tube and dropping funnel. 40.8 g. of 2-ethyl-2-hydroxy malonic acid diethyl ester are added dropwise at a temperature between 20 and 30° while cooling. After hydrogen evolution is completed the content of the flask is heated to 50° and benzyl chloride is added. The mixture is subsequently heated to 60–65° for 4 hours. A solution of 0.46 g. of sodium in 26 cc. of absolute alcohol is added and stirring is continued at 60° for half an hour. The mixture is then cooled to room temperature and neutralized with glacial acetic acid. After the addition of 1 liter of water extraction with ether is effected and the ether solution is washed with water and an aqueous sodium bicarbonate solution. After drying with sodium sulphate the ether is distilled off. The residue is distilled in a high vacuum at a bath temperature of 180° and yields pure 2-ethyl-2-benzyloxy-malonic acid diethyl ester. B.P. 120–140°/0.2 mm. of Hg.

(b) 2-ethyl-2-benzyloxy-malonic acid diethyl ester (method 2)

133 g. of 2-benzyloxy-malonic acid diethyl ester and 92.5 g. of diethyl sulphate are placed in a sulphonating flask (stirrer, reflux condenser, thermometer). A sodium ethylate solution prepared from 15.0 g. of sodium and 300 cc. of ethanol is added dropwise during the course of 1½ hours while cooling slightly, whereby the temperature is kept between 35° and 45°. The mixture is subsequently stirred for a further 2 hours at 45° and for 1 hour at 60°. The reaction mixture is then cooled to room temperature, is neutralized with glacial acetic acid and 1.5 liters of water are added. Working up is effected by extracting several times with ether, washing the ether solution with an aqueous sodium bicarbonate solution and subsequently with water. Drying is effected with sodium sulphate and the ether is evaporated. The residue is distilled in a high vacuum at about 0.1 mm. of Hg, the oil bath being heated to about 200°, whereby pure 2-ethyl-2-benzyloxy-malonic acid diethyl ester, having a B.P. of 120–140°/0.1 mm. of Hg, distils over.

(c) Racemic 2-ethyl-2-benzyloxy-malonic acid monoethyl ester 605 g. (2.06 mols) of crude 2-ethyl-2-benzyloxy-malonic acid diethyl ester are dissolved in 1730 cc. of absolute ethanol and the solution is cooled to +10°. A solution of 118 g. of potassium hydroxide (2.11 mols) in 1150 cc. of absolute ethanol is added dropwise at 10–15° to this solution while stirring during the course of half an hour. The mixture is subsequently allowed to stand over night at room temperature. Before working up the ethanol is removed at a bath temperature of 50°, the residue is diluted with 500 g. of ice, 500 cc. of a saturated aqueous sodium hydrogen carbonate solution and 300 cc. of water, and the aqueous alkaline solution is extracted thrice with 1 liter amounts of toluene in order to remove the neutral portion. The aqueous solution of the sodium salt of the semiester is subsequently acidified (pH 2.5–3) with ice-cold dilute phosphoric acid and is extracted thrice with 1.5 liter amounts of benzene, the benzene solutions are washed twice with ½ liter amounts of water and dried with 500 g. of sodium sulphate. The solvent is removed at 50–60°, whereby the semiester (a viscous, yellow coloured oil) is obtained as residue. $n_D^{20}=1.4980$.

(d) (+)-2-ethyl-2-benzyloxy-malonic acid monoethyl ester 532 g. (2.13 mols) of crude, racemic 2-ethyl-2-benzyloxy-malonic acid monoethyl ester and 630 g. of cinchonidine (2.13 mols) are dissolved while hot in as little as possible of ethyl acetate and after cooling dilution is effected with 700 cc. of heptane, whereby crystallization slowly commences. The mixture is allowed to stand at +5° for 1 day, whereby a thick crystalline mash of the cinchonidine salt of (−)-2-ethyl-2-benzyloxy-malonic acid monoethyl ester results. The crystals are again recrystallized from ethyl acetate. The cinchonidine salt of (−)-2-ethyl-2-benzyloxy-malonic acid monoethyl ester is obtained in optically pure form: colourless needles having a M.P. of 147–148°, $[\alpha]_D^{20}=-66°$ (c.=1, ethanol).

The first mother liquor, which contains the enriched cinchonidine salt of (+)-2-ethyl-2-benzyloxy-malonic acid monoethyl ester, is split up into cinchonidine and enriched (+)-2-ethyl-2-benzyloxy-malonic acid monoethyl ester by distributing between ether and 10% aqueous phosphoric acid. After evaporating the ether which has been dried over sodium sulphate, (+)-2-ethyl-2-benzyloxy-malonic acid monoethyl ester is obtained as a brown oil. $[\alpha]_D^{20}=+2.3°$ (c.=4, ethanol), $n_D^{22}=1.4965$.

(e) S-(+)-2-ethyl-2-benzyloxy-malonic acid chloride monoethyl ester 55.5 g. of absolute dimethyl formamide are added to 187 g. of (+)-2-ethyl-2-benzyloxy-malonic acid monoethyl ester in 200 cc. of absolute methylene chloride and the mixture is cooled to +10°. 55.5 cc. of freshly distilled thionyl chloride are added dropwise to this solution at +10° during the course of 1 hour and the mixture is allowed to stand at 20° for 2 days. The volatile components are then removed in a water jet vacuum first at room temperature, and subsequently in an oil bath at 100°. In this manner the dimethyl formamide, accompanied by smaller amounts of other unknown products, can be distilled off. The residue is then distilled in a high vacuum, whereby S-(+)-2-ethyl - 2 - benzyloxy-malonic acid chloride monoethyl ester is obtained as a practically colourless oil having a B.P. of 85–90°/0.001 mm. of Hg. $n_D^{20}=1.5000$, $[\alpha]_D^{20}=+19°$ (c.=2, benzene).

What is claimed is:
1. A crystalline compound of the formula:

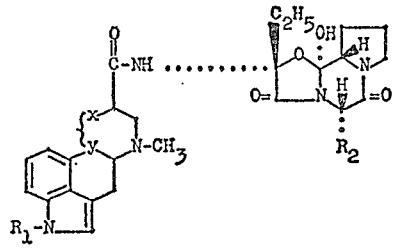

wherein

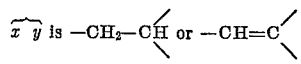

$R_1$ is hydrogen or methyl, and $R_2$ is isopropyl or isobutyl, or a pharmaceutically acceptable acid addition salt thereof.

2. The crystalline compound of claim 1 which is ergonine.
3. The compound of claim 1 which is ergonine bimaleate.
4. The crystalline compound of claim 1 which is 9,10-dihydro-ergonine.
5. The compound of claim 1 which is 9,10-dihydro-ergonine hydrochloride.
6. The crystalline compound of claim 1 which is 1-methyl-ergonine.
7. The compound of claim 1 which is 1-methyl-ergonine bitartrate.
8. The crystalline compound of claim 1 which is 1-methyl-9,10-dihydro-ergonine.
9. The crystalline compound of claim 1 which is ergoptine.
10. The compound of claim 1 which is ergoptine bimaleate monohydrate.
11. The crystalline compound of claim 1 which is 9,10-dihydro-ergoptine.
12. The compound of claim 1 which is 9,10-dihydro-ergoptine hydrochloride.
13. The crystalline compound of claim 1 which is 1-methyl-ergoptine.
14. The crystalline compound of claim 1 which is 1-methyl-9,10-dihydro-ergoptine.

References Cited
UNITED STATES PATENTS

| | | | |
|---|---|---|---|
| 3,218,324 | 11/1965 | Hofmann et al. | 260—285.5 |
| 3,336,311 | 8/1967 | Hofmann et al. | 260—268 |
| 3,422,110 | 1/1969 | Stadler et al. | 260—268 |
| 3,428,639 | 2/1969 | Stadler et al. | 260—268 |

OTHER REFERENCES

Mantle et al.: Abstr. in Chem. Abstr., vol. 69, col. 67 596s (1968).

Subs. Index, Chem. Abstr., vol. 69, p. 1207E (1968).

DONALD G. DAUS, Primary Examiner

U.S. Cl. X.R.

260—268TR, 268 MK, 285 J; 424—261